United States Patent Office

3,078,304
Patented Feb. 19, 1963

3,078,304
PREPARATION OF DIORGANOHALOPHOSPHINES
Heinz Niebergall, Frankfurt am Main, Germany, assignor to Koppers Company, Inc., a corporation of Delaware
No Drawing. Filed Apr. 18, 1960, Ser. No. 23,599
4 Claims. (Cl. 260—543)

This invention relates to the preparation of diorganohalophosphines. In one specific aspect, it relates to a new method of making diarylmonohalophosphines by a disproportionation reaction.

In recent years there has been a considerable effort by workers in the art to develop new and better methods for making organophosphines. Aliphatic monohalophosphines have been prepared in the past by the reaction of alkyldihalophosphines with tetraethyl lead, although the analogous reaction using the corresponding aryl compounds is not known. While both dialkylmonohalophosphines and diarylmonohalophosphines can be made by reacting the corresponding diorganomercury compounds with organodihalophosphines, the yields obtainable by this method do not exceed 50–60%, and the mercury compounds usually cannot be eliminated from the resultant products. Furthermore, the organomercury compounds are difficult to work with because of their high toxicity.

Satisfactory yields of diphenylmonochlorophosphines have been obtained from the reaction of $P_4S_{10}$ and benzene in the presence of eight moles of aluminum chloride, which results in the formation of $(C_6H_5)_2PS_2H$; this compound reacts with chlorine to give diphenyltrichlorophosphine which is then converted with elemental phosphorus to diphenylmonochlorophosphine in a 70% yield. This method is cumbersome, since it involves the use of large amounts of aluminum chloride. Furthermore, the economic value of the method is affected by the use of elemental phosphorus, chlorine, and especially $P_4S_{10}$. Since the synthesis proceeds via three steps, it requires a relatively large amount of equipment and the total reaction time is quite long. Working with $P_4S_{10}$ is also not desirable because of the strong odor and the toxicity of the resulting intermediate compounds. The overall yield of the desired product is about 56%.

The synthesis of diphenylchlorophosphine by the disproportionation of phenyldichlorophosphine in a sealed tube at 300° C. under autogenous pressure is also known from early work reported by Michaelis in Ber. 12, 1,000 (1879). This process is not practical for many reasons. Reactions in an autoclave are complicated and expensive; the high temperatures and pressures required by this particular reaction necessitates the use of expensive and well designed pressure vessels. Furthermore, operation in pressure vessels calls for special skills and particular precautionary measures, such as the use of isolated rooms and continued attention during operation. The economy of the high pressure disproportionation reaction is seriously impaired by the fact that maximum yield obtainable is only 36%.

Kosolapoff et al., J. Am. Chem. Soc. 69, 2020 (1947) reported the formation of small amounts of diarylchlorophosphines during the reaction of aromatic hydrocarbons and phosphorus trichloride in the presence of aluminum chloride. They found that it was not possible to obtain good yields of isolated halophosphines by this procedure because of the formation of a stable adduct between the aluminum chloride and the desired products. They therefore necessarily resorted to the laborious and expensive process of isolating the halophosphines as esters, then reconverting them to halides.

Quite surprisingly, I have discovered a novel method of effecting the disproportionation of aryldichlorophosphines whereby the useful diarylmonochlorophosphines are obtained in substantially pure form in yields of up to about 80%.

It is, therefore, an object of the present invention to provide a new, direct and economical method of preparing diarylmonohalophosphines.

In accordance with the invention diarylhalophosphines are made in high yields by the disproportionation of aryldihalophosphines to form diarylhalophosphines and phosphorus trihalides according to the following equation:

$$2RPX_2 \rightarrow R_2PX + PX_3$$

In the above equation R is an aryl nucleus such as phenyl or naphthyl which may be unsubstituted or which may have simple non-electrophillic substituents such as lower alkyl, halo or aminoalkyl radicals affixed to the nucleus. X is a halogen selected from the group consisting of fluorine, chlorine and bromine. The improvement of the invention is effected by heating in the presence of a Lewis acid catalyst an aryldihalophosphine of the formula $RPX_2$, wherein R and X have the values given hereabove, at atmospheric pressure or reduced pressures and at a temperature above the boiling point of the phosphorus trihalide, $PX_3$, formed during the disproportionation reaction and below the decomposition point of the reactant and product arylhalophosphines. The phosphorus trihalide is continuously removed from the reaction mixture to shift the equilibrium in favor of $R_2PX$ formation. At the termination of the reaction the desired diarylhalophosphine is recovered in substantially pure form.

The starting reactants, i.e. the aryldihalophosphines of the formula given hereabove, can be readily made in good yield. They are advantageously prepared from the Friedel-Crafts reaction of phosphorus trihalides and aromatic hydrocarbons in the presence of an aluminum chloride catalyst. Phenyldichlorophosphine, for example, is obtained by this method in yields exceeding 90%.

One of the outstanding advantages of the present invention is that the use of increased pressures is obviated. The reaction is most conveniently run at atmospheric pressure, although reduced pressures, of e.g. 100 to 750 m. of Hg, are often helpful in facilitating product removal.

Since the reaction is conducted at atmospheric or at slightly reduced pressures, only very simple equipment is required. Conveniently, the reaction vessel can have a jacketed condenser attached thereto. Through the jacket is passed a heated liquid or the distillation vapor of a liquid having a boiling point exceeding, e.g. by 5–30° C., the boiling point of the phosphorus trihalide formed during the reaction, thus permitting the removal of only the phosphorus trihalide from the reaction mixture. For example, during the disproportionation of phenyldichlorophosphine water vapor is advantageously passed through the jacket surrounding the condenser, since the resulting $PCl_3$ boils at 75.5° C. Under such conditions the $PCl_3$ can be readily removed from the reaction vessel and the phenyldichlorophosphine and diphenylchlorophosphine, which have markedly higher boiling points (205 and 330° C., respectively) are retained, owing in part to the cooling effect of the evaporating $PCl_3$. During the preparation of phenyldibromophosphine, wherein $PBr_3$ (B.P. 173° C.) distills off from the reaction mixture, it is advisable to heat the condenser with the distillation vapor of a high boiling solvent such as Dekalin (B.P. 185° C.). The temperature of the condenser may, of course, be controlled by different means, depending upon the equipment available. Any heated fluid having a boiling point of e.g. 78–210° C. can be used, depending on the choice of reactant and operating conditions. Thus, wet or dry steam, Dowtherm liquid, mercury and the like are effective in controlling the condenser temperature.

For purposes of the invention it is necessary to use a reaction temperature which is higher than the boiling point under the pressure conditions employed of the particular phosphorus trihalide formed during the reaction and below at which there is considerable decomposition of reactants and products. Preferred reaction temperatures range between 200–300° C.

The disproportionation is effected in the presence of a catalytic amount of a Lewis acid. Suitable Lewis acids for use in the invention include, for example, the chlorides of the metals of aluminum, iron, titanium, lead, boron, tin, antimony, cobalt, nickel, bismuth, germanium, vanadium, molybdenum, zirconium, platinum and zinc. Zinc chloride has an especially strong catalytic effect on the disproportionation reaction, and undesired side reactions are less frequent therewith than with certain other Lewis acids such as aluminum chloride. It is advisable to use a catalyst that responds best to the mobility of the aryl radical linked to the phosphorus atom. Preferably, only such Lewis acids are used that do not participate in undesired side reactions with the starting reactant or with the final products.

It is desirable to use a Lewis acid having a boiling point higher than that of the phosphorus trihalide which is distilled off during the course of the reaction. Certain lower boiling Lewis acids may be used if they are capable of forming high boiling complexes with alkali metal halides, tertiary bases such as tertiary amines, and certain other compounds. As an example of complex formation, aluminum chloride reacts with potassium chloride to form the high boiling complex $KAlCl_4$. In the case of aluminum chloride, although it is higher boiling than the phosphorus trihalides, it is helpful to form this complex to render the catalyst more easily separable from the desired product.

The catalyst is preferably used in amounts of about 1–5% by weight based upon the weight of the aryldihalophosphine reactant.

The disproportionation is usualy complete within a few hours. The extent of reaction can be readily established by measuring the amount of phosphorus trihalide collected in a suitable receiver. Substantial completion of the reaction can be determined by the cessation of phosphorus trihalide recovery from the reaction mixture.

The diarylmonohalophosphines made according to the invention are useful, inter alia, in the preparation of plasticizers, insecticides, lubricant additives and flameproofing agents. For example, ditolylchlorophosphine can be converted to diisobutylditolylphosphinate by reacting the ditolylchlorophosphine with isobutyl alcohol and treating the resulting product with aqueous hydrogen peroxide. A useful lacquer for chemically resistant or protective coatings for concrete has the following composition:

| | Parts |
|---|---|
| Xylene | 50 |
| Chlorinated rubber | 25 |
| Diisobutylditolylphosphinate | 13 |
| $TiO_2$ | 12 |

The diisobutylditolylphosphinate is useful as a plasticizer for polyvinyl chloride when added thereto, for example, in amounts of 30–40% by weight. In pastes for the production of imitation leather, polyvinylchloride and diisobutylditolylphosphinate are used in a ratio of 55:45; for the production of molded articles they are used in a ratio of about 70:30. Other dialkyldiarylphosphinates made from the compounds provided by the method of the invention are similarly useful.

My invention is further illustrated by the following examples.

*Example I*

In a 500 ml. two-necked flask with attached Dimroth condenser (30 cm. long) and a distillation bridge connected thereto 250 g. phenyldichlorophosphine was mixed with 12.5 g. anhydrous zinc chloride and heated to boiling temperature (temperature of the oil bath 280° C.). The cooling coil of the Dimroth condenser was heated with water vapor, so that only the product phosphorus trichloride could distill off. After 5½ hours the distillation rate decreased markedly. During this period the temperature inside the flask rose from 215 to 255° C. Fractional distillation at 2 mm. of Hg gave 92 g. diphenylchlorophosphine (B.P. 134–136° C. at 2 mm. of Hg). The yield obtained was 60% of theory. In successive experiments in which the heating was somewhat prolonged, the yield rose to 65%.

*Example II*

A 500 ml. two-necked flask provided with a thermometer, a steam-heated reflux condenser and a distillation bridge with collector connected thereto was charged with 325.8 g. tolyldichlorophosphine and 16.3 g. anhydrous $ZnCl_2$ (5% by weight). The reaction time was five hours at a pot temperature of from 220 to 275° C. During this time 102 g. $PCl_3$ distilled over. The reaction mixture was vacuum-fractionated to give 65 g. tolyldichlorophosphine (B.P. 85–90° C. at 2.5 mm. of Hg) and 125 g. ditolylchlorophosphine (B.P. 158–160° C. at 2.5 mm. of Hg). The yield of ditolylchlorophosphine corresponded to about 60% of theory on the first pass. On returning the 65 g. of tolyldichlorophosphine to the reaction vessel, an additional 25 g. ditolylchlorophosphine, corresponding to another 12% of theory, was obtained. Thus the ultimate yield can amount to about 77% of theory.

Similar results are obtained using the chlorides of aluminum, iron, titanium, lead, tin, antimony, cobalt, nickel, bismuth, germanium, vanadium and platinum as catalysts.

*Example III*

Using the equipment described in the previous examples, 414 g. p-chlorophenyldichlorophosphine and 10.4 g. (5% by weight of the phosphine reactant) of zinc chloride were heated for 4½ hours at a pot temperature ranging between 245–265° C. The product was removed from the reaction mixture as it was formed. In this single pass there was obtained approximately a 50% yield of bis-(chlorophenyl)chlorophosphine (B.P. 184–186° C. at 2.5 mm. of Hg).

*Example IV*

The procedure of Example III was substantially repeated, with the exception that the quantity of phosphine reactant was varied and aluminum chloride was used as a catalyst. 232 g. p-chlorophenyldichlorophosphine and 7 g. aluminum chloride were heated for one hour to give a 10% greater conversion to bis-(p-chlorophenyl)-chlorophosphine than was obtained in Example III, but this was accompanied by a 50% increase in the formation of undesirable resinous by-products.

I claim:

1. A method of making diarylhalophosphines by the disproportionation of aryldihalophosphines to form diarylhalophosphines and phosphorus trihalide comprising the steps of:

(a) heating an aryldichlorophosphine of the formula $$RPX_2$$ 

wherein R is a member selected from the group consisting of phenyl, tolyl and chlorophenyl, and X is a member selected from the group consisting of bromine and chlorine, in the presence of 1–5 percent by weight of a metal chloride Lewis acid catalyst at a temperature of 200–300° C. and at a pressure not in excess of substantially atmospheric pressure, (b) continuously removing from the reaction mixture said phosphorus trihalide as it is formed, and (c) recovering said diarylhalophosphine by fractional distillation under subatmospheric pressure.

2. Method according to claim 1 wherein the aryldihalophosphine is p-chlorophenyldichlorophosphine.

3. A method of making diphenylchlorophosphines by the disproportionation of phenyldichlorophosphines to form diphenylchlorophosphines and phosphorus trichloride comprising heating phenyldichlorophosphine in the presence of 1-5 percent by weight of a metal chloride Lewis acid catalyst at a temperature of 200-300° C. and at a pressure not in excess of substantially atmospheric pressure, continuously removing from the reaction mixture said phosphorus trichloride as it is formed, and recovering said diphenylchlorophosphine by fractional distillation under subatmospheric pressure.

4. Method according to claim 3 wherein the Lewis acid catalyst is a member selected from the group consisting of the chlorides of aluminum, iron, titanium, lead, boron, tin, antimony, cobalt, nickel, bismuth, germanium, vanadium, platinum and zinc.

References Cited in the file of this patent
UNITED STATES PATENTS 2,779,787    Higgins et al. _____ Jan. 29, 1957

OTHER REFERENCES

Broglie: "Ber. Deut. Chem.," vol. 10, p. 628 (1877).
Dorken: "Ber. Deut. Chem.," vol. 21, pp. 1505–1515 (1888).
Kosolapoff: "J.A.C.S.," vol. 69, pp. 2020–2021 (1947).
Kosolapoff (II): "Organophosphorous Compound," pp. 43 to 46 (1950).
Brown et al.: Chem. and Ind., No. 1, p. 24 (1961).

UNITED STATES PATENT OFFICE
CERTIFICATE OF CORRECTION

Patent No. 3,078,304                                       February 19, 1963

Heinz Niebergall

It is hereby certified that error appears in the above numbered patent requiring correction and that the said Letters Patent should read as corrected below.

Column 2, line 40, for "750 m." read -- 750 mm. --.

Signed and sealed this 28th day of April 1964.

(SEAL)
Attest:

ERNEST W. SWIDER                                   EDWARD J. BRENNER

Attesting Officer                                       Commissioner of Patents